(12) United States Patent
Brady et al.

(10) Patent No.: US 8,441,904 B2
(45) Date of Patent: May 14, 2013

(54) METHOD AND APPARATUS FOR MEASURING A SIGNAL

(75) Inventors: Keith Brady, Fareham (GB); Gregory Quick, Hayling Island (GB)

(73) Assignees: Xyratex Technology Limited, Havant (GB); Seagate Technology LLC, Scotts Valley, CA (US)

( * ) Notice: Subject to any disclaimer, the term of this patent is extended or adjusted under 35 U.S.C. 154(b) by 126 days.

(21) Appl. No.: 13/131,133

(22) PCT Filed: Nov. 30, 2009

(86) PCT No.: PCT/EP2009/066084
§ 371 (c)(1),
(2), (4) Date: May 25, 2011

(87) PCT Pub. No.: WO2010/063684
PCT Pub. Date: Jun. 10, 2010

(65) Prior Publication Data
US 2011/0228660 A1    Sep. 22, 2011

Related U.S. Application Data

(60) Provisional application No. 61/118,805, filed on Dec. 1, 2008.

(51) Int. Cl.
*G11B 27/36* (2006.01)
(52) U.S. Cl.
USPC .............................. 369/53.44; 360/51; 360/69
(58) Field of Classification Search ...... 369/53.1–53.14, 369/53.25, 53.31–53.36, 53.38, 53.41–53.44; 360/31, 360/69, 75, 51, 77.02
See application file for complete search history.

(56) References Cited

U.S. PATENT DOCUMENTS

| 6,700,369 | B1 * | 3/2004 | Makuuchi et al. | 360/31 |
| 2003/0002198 | A1 * | 1/2003 | Subrahamanyan et al. | 360/77.02 |
| 2005/0248868 | A1 * | 11/2005 | Perez | 360/31 |
| 2008/0037152 | A1 * | 2/2008 | Wang et al. | 360/31 |
| 2010/0265608 | A1 * | 10/2010 | Lee et al. | 360/31 |
| 2011/0032631 | A1 * | 2/2011 | Brady et al. | 360/31 |

FOREIGN PATENT DOCUMENTS

| EP | 0 439 278 | 7/1991 |
| WO | 2008/142004 | 11/2008 |

OTHER PUBLICATIONS

International Search Report mailed Mar. 3, 2010 in corresponding International Patent Application No. PCT/EP2009/066084.
M.J. Darcy, "Digital Down-Conversion," GEC Journal of Research, vol. 10, No. 1, pp. 29-35 (Jan. 1, 1992).

* cited by examiner

*Primary Examiner* — Thang Tran
(74) *Attorney, Agent, or Firm* — Pillsbury Winthrop Shaw Pittman LLP

(57) ABSTRACT

There is disclosed a method and apparatus for measuring a signal using a measurement system. The signal has a frequency component that is to be detected by the measurement. The frequency component has a varying phase. The signal has at least one interruption thereto. The method includes: processing the signal with the measurement system to detect the frequency component in the signal and stalling the measurement system before the start of the interruption. The stall period is calculated such that the processing of the signal is resumed: i) after the end of the interruption, and ii) where there is substantially no discontinuity between the phase of the frequency component in the signal at the end of the stall and in the phase of the frequency component in the signal at the beginning of the stall.

22 Claims, 10 Drawing Sheets

METHOD AND APPARATUS FOR MEASURING A SIGNAL

CROSS REFERENCE TO RELATED APPLICATIONS

This application is the National Phase entry of PCT/EP2009/066084, filed Nov. 30, 2009, which claims priority to U.S. Provisional Patent Application No. 61/118,805, filed Dec. 1, 2008. The content of these applications is incorporated herein by reference in their entirety.

This application claims the benefit of priority to U.S. application Ser. No. 60/118,805, filed Dec. 1, 2008, the content of which is hereby incorporated by reference.

The present invention relates to a method and apparatus for measuring a signal, the apparatus in combination with a spinstand, a method of writing a test data pattern, a method of testing with a spinstand and a spinstand. A spinstand is a test platform for testing the performance of the various components of disk drives, for example the read/write heads and disks.

There are many applications where it is desired to measure a signal in order to detect the presence of or measure the magnitude of a particular frequency component occurring in the signal. Various measurement systems for making such a measurement are known. For example, at the heart of many techniques, the signal is passed through some form of bandpass filter that passes the frequency component of interest. The power of the filtered signal is then detected to give a measure of the frequency component.

The measurement system has a property known as the resolution bandwidth (RBW), which is a measure of the width of the filter and hence the ability of the system to pick out a particular frequency component from a signal. In some measurement systems the RBW is adjustable. Often the component of interest in the signal is of low power compared with other signal components or noise in the signal. A low resolution bandwidth is generally preferred in this instance, in order to better pick out the frequency component from the signal. However, a potential drawback of having a low resolution bandwidth is that to implement this, the measurement system is often required to use filters of a high order, which typically require a relatively long time to settle.

The settling time of a filter is a measure of how long it takes the output of a filter to reach its steady state in response to a particular input. Generally, a filter needs to operate on a certain length of signal before a useful output is obtained. For example, a Finite Impulse Response filter of a given number of "taps" "remembers" a number of signal samples that is equal to the number of taps. Thus, a number of signal samples equal to the number of taps must be presented to the filter in order to "warm up" the filter, before the output of the filter reaches its steady state in response to the input. Another aspect of the settling time of a filter is that if the filter removes tones, then unit steps cannot be passed by the filter.

In some applications the signal to be measured may be only available in short fragments or frames, or will otherwise have interruptions to it in which the frequency component to be detected is not present in the signal. This means that the length of signal in which the frequency component to be measured is continuously present may be short. Using conventional techniques, the measurement system would have to perform its measurement of the signal starting anew within each uninterrupted fragment of signal. This presents a problem for a measurement system having a low resolution bandwidth, since the system may not have adequate time to settle within the time span of the fragment of signal. This may lead to a loss of accuracy in the results or even in it not being possible to make any useful measurement at all.

According to a first aspect of the present invention, there is provided a method of measuring a signal using a measurement system, the signal having a frequency component that is to be detected by the measurement, the frequency component having a varying phase, the signal having at least one interruption thereto, the method comprising: processing the signal with the measurement system to detect said frequency component in the signal; stalling the measurement system before the start of the interruption such that the signal is not processed during the interruption; calculating a stall period such that the end of the stall occurs: i) after the end of the interruption, and ii) where there is substantially no discontinuity between the phase of the frequency component in the signal at the end of the stall and in the phase of the frequency component in the signal at the beginning of the stall; and, ending the stall of the measurement system at the end of the calculated stall period so as to resume processing of the signal.

The interruption to the signal may be such that, for example, the frequency component is substantially or entirely not present in the signal during the interruption. Alternatively, it may be that the frequency component is attenuated during the interruption, or is corrupted, or is only present as part of a different underlying signal. In any event, the interruption to the signal generally means that it is desired not to include the interrupted part of the signal in the measurement of the frequency component since otherwise the interruption may reduce the accuracy of the measurement.

Typically a measurement system has a filter for detecting the frequency component. By restarting the measurement at a point where the next signal fragment is substantially in phase with the previous signal fragment, the filter does not see any significant discontinuity between two fragments either side of the interruption. Thus the measurement system can have a low resolution bandwidth (which implies a long settling time), as restarting the filter in phase means that it does not have to settle to a new input each time an interruption is encountered. The method is especially advantageous in situations where the settling time of the filter is longer than the signal fragments. Prior art methods do not handle this situation well, since the filter does not have time to settle on each fragment before the next interruption, and thus the accuracy of the measurement is impaired. In contrast, using the present method, the filter does not have to settle anew in each fragment, and thus the filter settle time is not limited by the length of the fragments. This means that filters with lower resolution bandwidths can be used in the measurement system compared with the prior art, which helps improves the accuracy of the measurement.

Preferably, the method comprises calculating the stall period such that the end of the stall occurs iii) at least an additional predetermined time after the end of the interruption.

Often the measurement system will comprise various modules or component parts some of which require relatively long settling times, which limits the overall settling time of the system, and some of which require relatively short settling times. Leaving an additional predetermined time before ending the stall of the measurement system can be used to allow the faster-settling parts of the measurement system to settle on the signal after the end of the interruption before the slower-settling parts resume processing of data. Note the stall period is still calculated such that there is substantially no discontinuity in phase of the frequency component in the signal at the end of the stall and in the phase of the frequency component in the signal at the beginning of the stall. This means that the slower-settling parts do not need to resettle after the stall.

For example, a preferred example of a measurement system is a digital system that comprises a digital down-converter (DDC) followed by a low-pass filter with a narrow cut-off frequency for detecting the frequency of interest. The DDC usually comprises one or more of its own filters, which require some time to settle. However, the DDC filter is typically not as narrow as the low-pass filter and has a lower order and so requires less time to settle. Leaving an additional predetermined time allows the DDC to settle before the stall of the low-pass filter is ended, such that when the low-pass filter begins to process samples again, the data it operates on is reliable. This improves the accuracy of the measurement. In embodiments, the additional time is equal to an integer multiple of the frequency component to be detected or, in the case where the signal is first shifted to an intermediate frequency, equal to an integer multiple of the intermediate frequency.

Accommodating longer settling times means that the filter can be made higher order and lower bandwidth. This can help detect faint signals.

Preferably, the method comprises: prior to the step of processing the signal, down-converting the signal to an intermediate frequency such that the frequency component to be detected is centred on the intermediate frequency; and, calculating the stall period to be an integer multiple of the period of the intermediate frequency.

Using an intermediate frequency is a known technique in spectral analysis to shift the frequencies of interest to a lower or a higher "intermediate frequency". In this case, this enables the stall period to be simply calculated by choosing an integer multiple of the period of the intermediate frequency.

Preferably the method comprises: digitising the signal to produce a digitised signal comprising signal samples; and, processing the samples with a digital processing engine to detect said frequency component in the signal; wherein the step of stalling the measurement system comprises at least stalling the digital processing engine.

This provides a simple way of implementing the system, particularly in relation to the stalling step.

In an embodiment, the method comprises: digitising the signal to produce a digitised signal comprising signal samples, wherein the ratio of the intermediate frequency to the sampling rate is substantially a integer ratio; and, processing the samples with a digital processing engine to detect said frequency component in the signal; wherein the step of stalling the measurement system comprises at least stalling the digital processing engine.

This is a particularly advantageous implementation. For example, this allows the measurement system to be stalled and restarted without introducing a discontinuity, as the quantisation of the desired stall period will not introduce an error. It is particularly preferred to have the sampling rate at an integer multiple of the IF. This means that the stall period, as calculated to be an integer multiple of the IF period, will naturally coincide with the occurrence of a sample. Thus processing can be commenced after the stall without introducing a discontinuity. If the sampling rate is not an integer multiple of the IF, then the end of the stall calculated to be in phase might occur between samples rather than coinciding with a sample. It is also possible to have the sampling rate to be a sub multiple of the IF if the IF is a sub-multiple of the sampling frequency. In this case, in order to avoid a discontinuity, which would affect the accuracy of the measurement, it would be necessary to extend the stall period for further multiples of the IF period until the end of the stall period coincided with the occurrence of a sample to within an acceptable tolerance.

Another advantage is that where an analogue-to-digital converter is used to digitise the signal and an oscillator is used to down-convert the head signal to an intermediate frequency, these can conveniently be clocked by the same clock source. Also, where the measurement system comprises a digital down-converter to shift the frequency of interest to base band, this allows the digital down-converter to be simplified (as described in more detail in the specific examples described in the following).

Preferably, the digital processing engine processes the samples by steps comprising: digitally down-converting the signal samples to a baseband signal; filtering the baseband signal with a low-pass filter that passes the frequency component; and, detecting the power of the filtered signal; wherein the step of stalling the digital processing engine comprises stalling the low-pass filter.

This provides an advantageous way of implementing and stalling the digital processing engine.

In a preferred embodiment, the method comprises: digitising the signal at a sampling rate that is four times the intermediate frequency; wherein digitally down-converting the digitised signal comprises: generating a phase channel from the digitised signal by multiplying each even-numbered sample by zero and multiplying each (4n+3)th sample by −1, where n is an integer>=0; and, generating a quadrature channel from the digitised signal by multiplying each odd-numbered sample by zero and multiplying each (4n+4)th sample by −1, where n is an integer>=0; the method comprising: filtering each of the phase channel and the quadrature channel with a respective low pass filter; and, detecting the power of the filtered phase and quadrature channels.

This provides a simple way of implementing the digital down-converter that allows the phase and quadrature channels to be modulated by a sine and cosine function without needing complicated provisions for generating the sine and cosine. Because the sampling rate is four times the IF, the operation can be performed by simply inverting and nullifying various samples as described. Thus, there is no need for complicated sine and cosine generating functions or look-up tables. This reduces the amount of digital logic required in the measurement module.

In an embodiment, the method comprises: buffering the samples in a buffer prior to being processed by the digital processing engine; and, flushing the samples in the buffer when the interruption is detected.

The buffer in effect introduces a delay into the processing of the samples by the digital processing engine. This permits any delay in identifying the start of the interruption to be allowed for. Any samples in the buffer corresponding to a time after the interruption has started can be flushed from the buffer before reaching the digital processing engine. Thus, the accuracy of the results are improved since samples taken after the interruption has started are not inadvertently processed by the digital processing engine due to the latency in the system.

According to a second aspect of the present invention, there is provided a method of testing with a spinstand having a disk and a read/write head, the method comprising: reading a track formed on the disk with the head to provide a head signal, the track having a data portion containing a data pattern and at least one servo sector containing servo information interspersed with the data portion; and, measuring the head signal according to the method described above, wherein the data pattern contains said frequency component to be detected by the measurement and each of said at least one servo sectors constitutes a respective interruption to the signal.

This allows a narrowband measurement to be made with the spinstand having embedded servo interleaved between the measurement data without restricting the settle time of the filters or the length of the measurement data. This largely obviates the need to wait for the filter to settle and for the measurements to be made within one continuous measurement data sector.

This allows various spinstand tests to be carried out with improved accuracy. For example, as described in more detail in the description below, a common test performed on a spinstand is the so-called overwrite test. In this test, a data pattern having a first frequency component is written to the disk. This is then overwritten by a data pattern having a second frequency component. The data is then read back and a narrowband measurement is made on the data to measure the residual trace of the first component.

It is often desired to use a narrowband measurement system with a low resolution bandwidth to allow the faint residual trace of the first component to be detected with more precision. However, a conflicting desire in some types of spinstands is to have many servo sectors interspersed with the data portion of the disk, in order to allow the head to be positioned on the disk with greater accuracy. Using conventional techniques, the interruptions to the data pattern caused by the servo sectors mean that the components of the measurement system having a high settling time do not have adequate time to settle within an uninterrupted portion of data to achieve good accuracy in the measurement. The preferred embodiment helps solve this problem as explained in greater detail above. In particular, by stalling the measurement system during the interruptions and restarting the measurement system on the signal with the same phase as when stalled, the measurement system does not see a discontinuity in the phase of the signal component to be detected, and so it is not necessary for the measurement system to settle. Thus for example a measurement system with a very narrow resolution bandwidth filter can be used to perform testing on a spinstand that uses many servo sectors, allowing more accurate results to be achieved.

Preferably, the method comprises writing said data portion to the disk such that the frequency component is in phase with itself on both sides of the servo sector.

This provides a simple way of making the calculation to allow the filter to be restarted on the signal in phase. The filter is preferably stalled for an integer multiple of the period of the frequency component in the signal when digitised.

In an embodiment, the method comprises: generating a servo gate signal with the spinstand; and, using said servo gate signal as a timing reference in the measurement system to determine the start of the interruption and the end of the interruption.

Spinstands commonly provide a "servo gate" signal, which indicates the start and end of a servo sector so that the processing system can process the head signal appropriately according to whether each section is data or servo information. This signal can be advantageously used to calculate the stall period.

According to a third aspect of the present invention, there is provided apparatus for measuring a signal, the signal having a frequency component that is to be detected by the measurement, the frequency component having a varying phase, the signal having at least one interruption thereto, the apparatus comprising: a measurement module arranged to process the signal so as to detect said frequency component in the signal; a stall control module arranged to stall the measurement module before the start of the interruption such that the signal is not processed during the interruption; wherein the stall control module is arranged to calculate a stall period such that the end of the stall occurs: i) after the end of the interruption, and ii) where there is substantially no discontinuity between the phase of the frequency component in the signal at the end of the stall and in the phase of the frequency component in the signal at the beginning of the stall; and, wherein the stall control module is arranged to end the stall of the measurement module at the end of the calculated stall period so as to resume processing of the signal.

According to a fourth aspect of the present invention, there is provided in combination, a spinstand and apparatus for measuring a signal as described above, the spinstand comprising: a read/write head; a disk; and, a track formed on the disk having a data portion containing a data pattern and at least one servo sector containing servo information interspersed with the data portion; wherein the spinstand is arranged to read the track with the head to provide a head signal, and the apparatus is arranged to measure the head signal; wherein the data pattern contains said frequency component to be detected by the measurement module and each of said at least one servo sectors constitutes a respective interruption to the signal.

According to a fifth aspect of the present invention, there is provided a method of writing a test data pattern to a disk of a spinstand, the disk having 1 to N servo sectors interleaved with 1 to N data sectors, where N is a integer>1, the method comprising: generating a test data pattern having a frequency component having a varying phase; and, writing the test data pattern to a first data sector and to a second data sector such that the phase of the data pattern is continuous across the first and second data sectors.

By writing the test data pattern to the disk such that it is in phase either side of a servo sector, this allows a particularly preferred embodiment of the measurement system described above to be used in testing with the spinstand. In particular, the calculation of the stall period is made simple in this case. The stall period is calculated to be an integer multiple of the period of the frequency component, or in the case, where an intermediate frequency is used, the stall period is calculated to be an integer multiple of the intermediate frequency. Thus the measurement system can be stalled during the servo sector and restarted via a simple calculation at a point where the test data pattern has substantially the same phase as before the stall. This helps avoid discontinuities in the signal that is filtered by the RBW filter, and thus means that the filter does not need to resettle on the test data pattern after each servo sector.

Preferably the method comprises: generating the test data pattern with a pattern generator; writing the test data pattern to the first data sector; continuing to generate the test data pattern during the servo sector following the first data sector whilst suspending the writing of the test data pattern during the servo sector; and, resuming writing the test data pattern to the second data sector such that the phase of the data pattern is continuous across the first and second data sectors.

According to a sixth aspect of the present invention, there is provided a method of testing with a spinstand, comprising: writing a test data pattern to a disk according to the method as described above; and, testing according to the method described above.

According to a seventh aspect of the present invention, there is provided a spinstand comprising a disk, the disk having at 1 to N servo sectors interleaved with 1 to N data sectors, where N is an integer>1, wherein first and second data sectors each have a test data pattern written thereto, the test data pattern having a frequency component having a varying phase, wherein the phase of the data pattern is continuous between the first and second data sectors.

Embodiments of the present invention will now be described by way of example with reference to the accompanying drawings, in which.

Figure 5A:
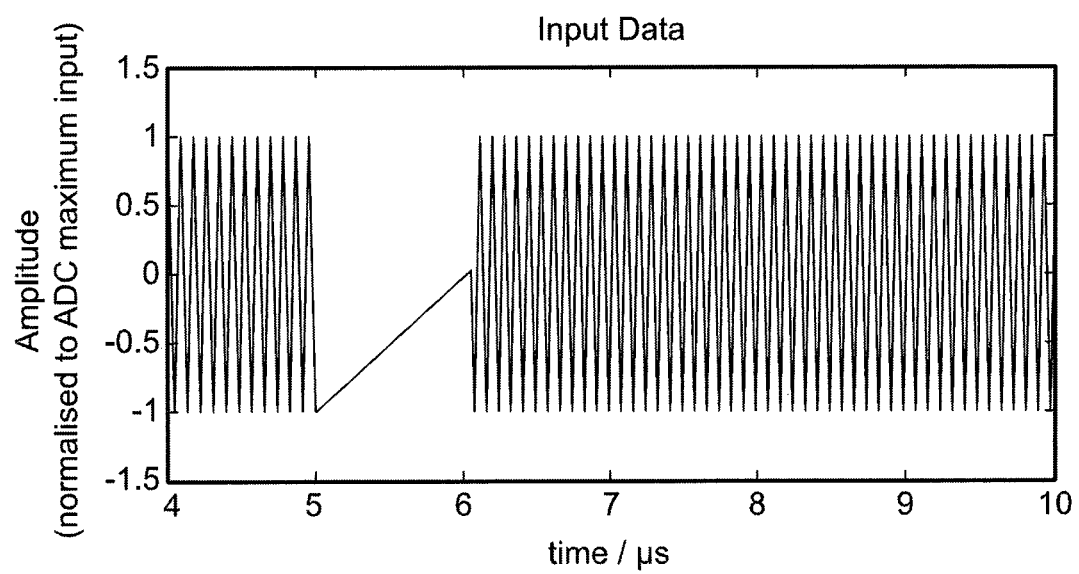
Figure 5B:
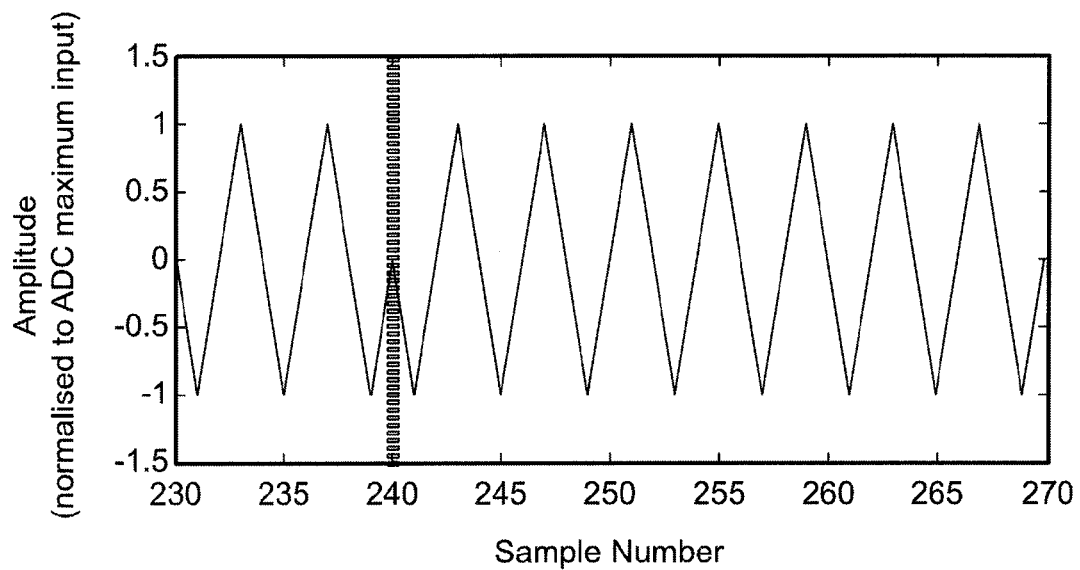
Figure 5C:
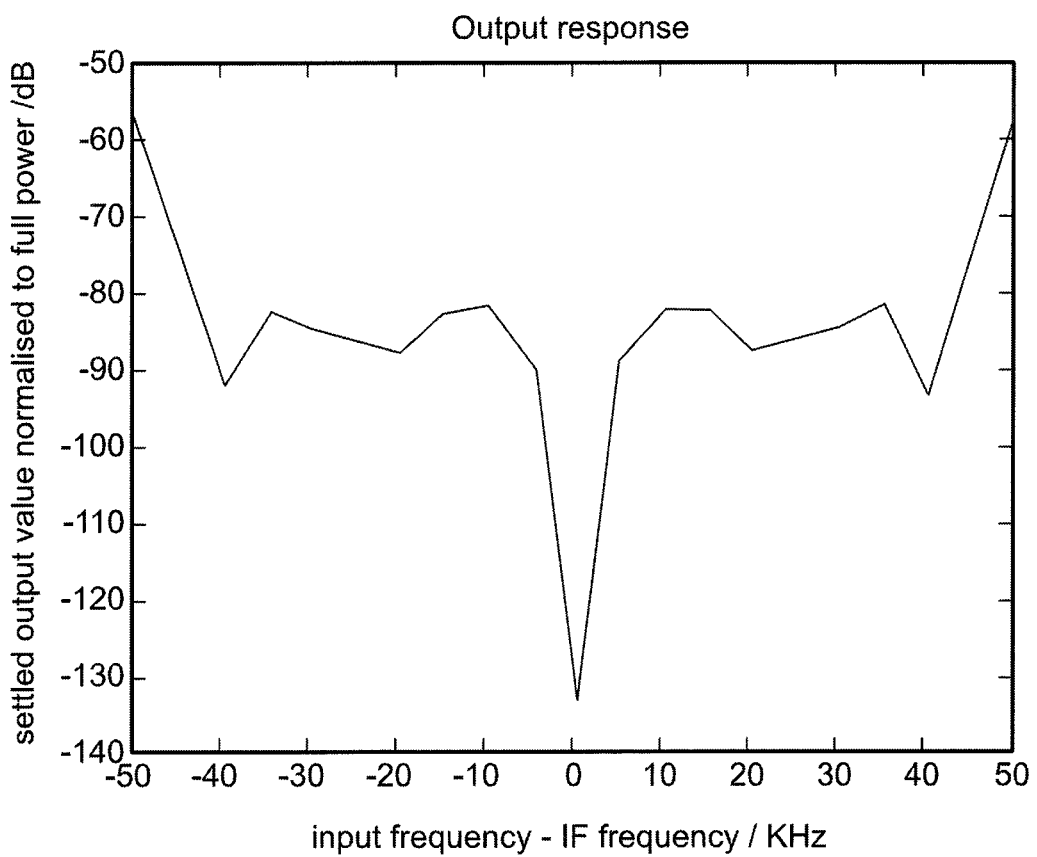
Figure 6A:
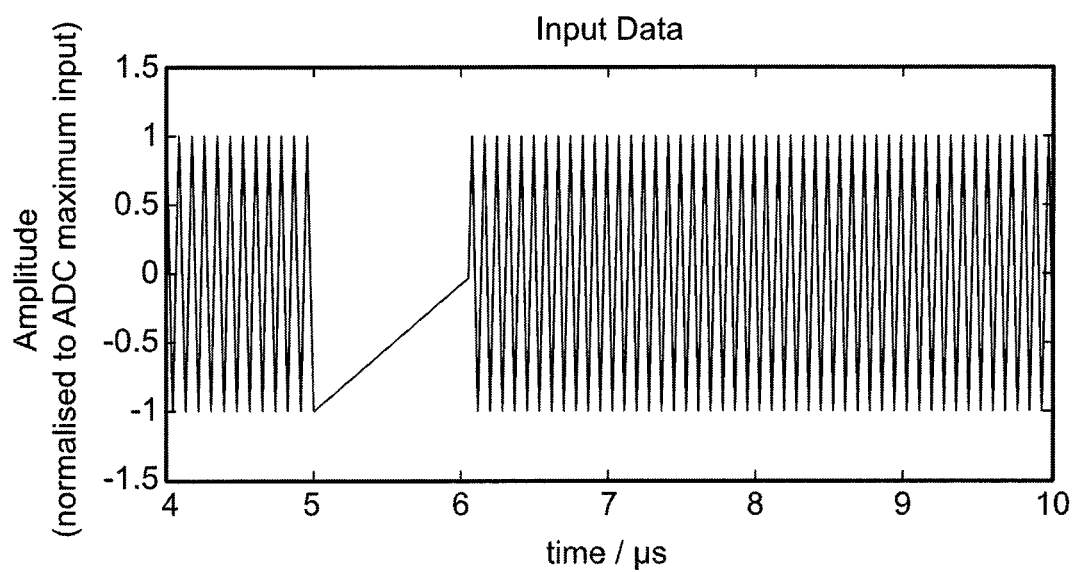
Figure 6B:
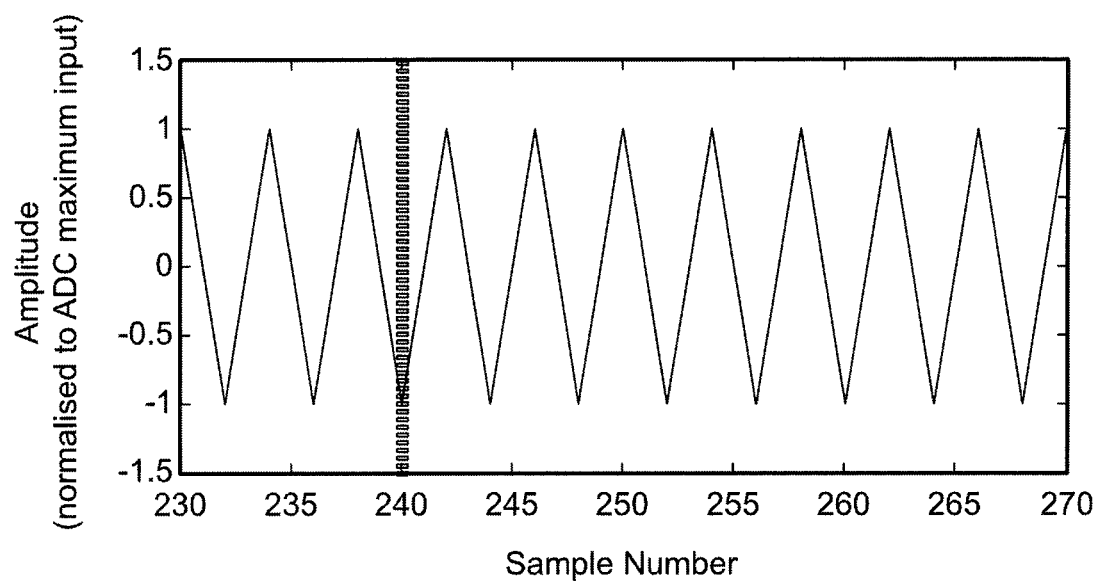
Figure 6C:
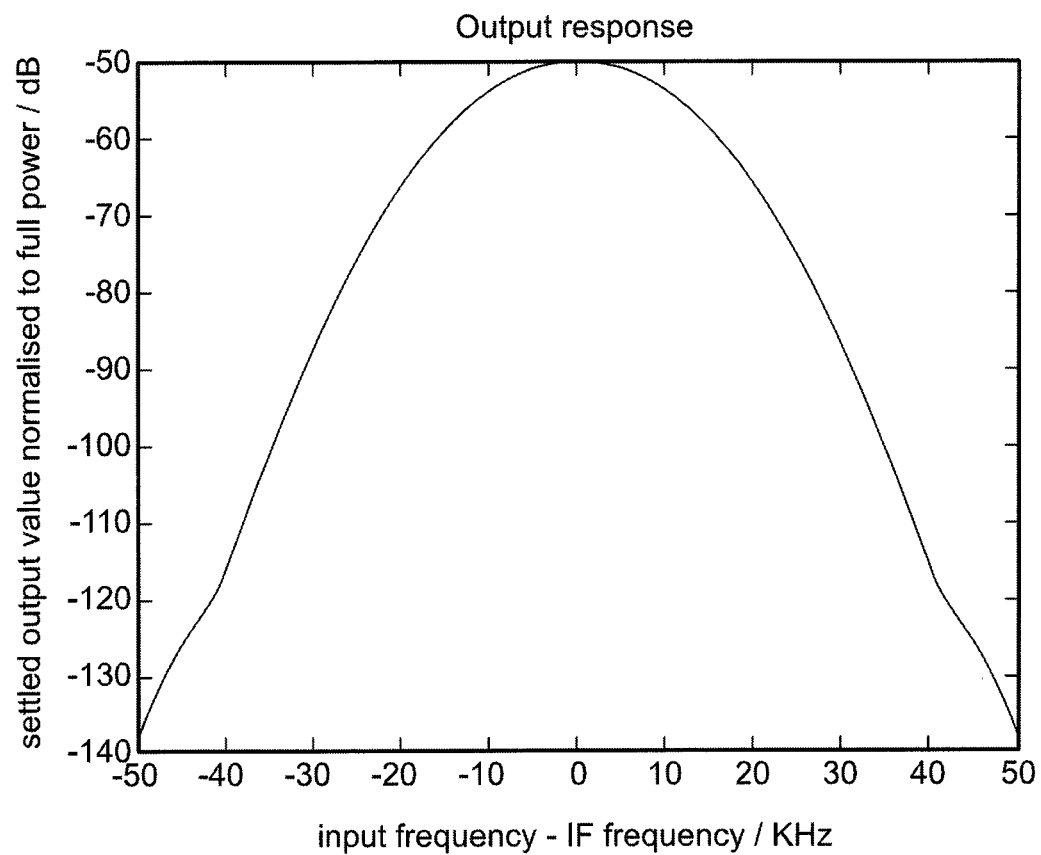

FIG. 5a shows a data pattern with a stall period of 1.0417 µs; FIG. 5b shows the sampled data pattern; and, FIG. 5c shows the results of a simulation on the data pattern; and, FIG. 6a shows a data pattern with a stall period of 1 µs; FIG. 6b shows the sampled data pattern; and, FIG. 6c shows the results of a simulation on the data pattern.

Figure 1:
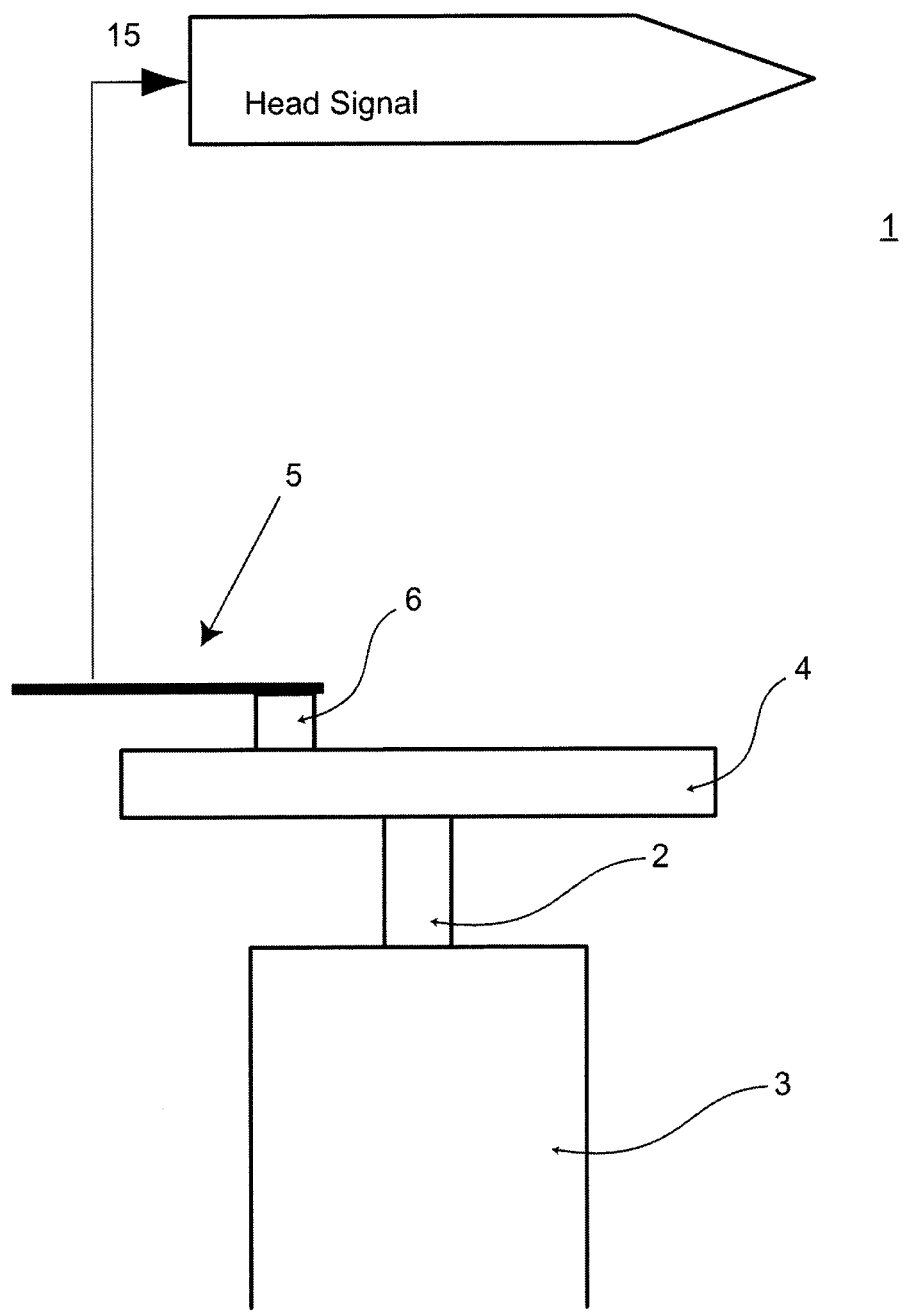
FIG. 1 shows schematically an example of a spinstand according to an embodiment of the present invention.

FIG. 1 shows schematically a spinstand 1 (such as are commonly known as "head media test apparatus" or "dynamic electrical test machines" in the art). Spinstands were first developed in the art as a tool for use during research and development to allow the performance of the various components of disk drives, for example the heads, disks and channels, to be evaluated and optimised. It is now common to also use spinstands in the field of disk drive manufacturing to test each manufactured read/write head or disk before it is assembled into a disk drive unit.

The spinstand 1 comprises an air-bearing spindle 3 to which a disk 4 is mounted using a disk adapter 2. The spinstand 1 also has a head load mechanism (not shown) for holding a head gimbal assembly 5 and positioning the read/write head 6 of the head gimbal assembly 5 over the surface of the disk 4 such that test data can be written to and read from a test track on the surface of the disk 4. The spinstand 1 also comprises a spinstand controller (not shown) under the control of which the head 6 is "flown" over the surface of the disk 4 when spun, so that test data can be written to and read from the disk 4 with the head 6.

Figure 2:
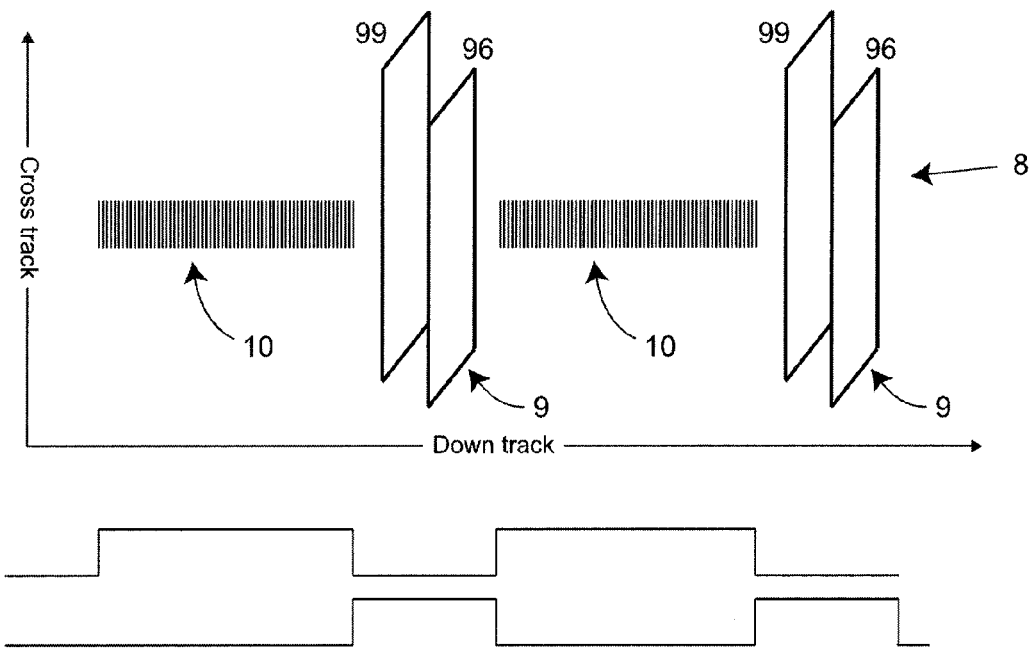
FIG. 2 shows an example of embedded servo according to an embodiment of the present invention.

The spinstand 1 of FIG. 1 employs so-called "embedded servo" to help position the head 6 over the disk 4. FIG. 2 shows a track 8 on the disk 4 illustrating this scheme. Positional marks known as servo bursts 9a,9b are formed on the disk 4. The servo bursts 9a,9b are normally written in servo sectors 9 which are interspersed, i.e. embedded, between data sectors 10 on the disk 4. The servo bursts 9a,9b are read by the head 6 as it flies over the track 8 and are subsequently used by the spinstand controller to allow the position of the head 6 relative to the disk 4 to be calculated. This helps the spinstand 1 reject disturbances to the position of the head 6 which may be caused, for example, by the effects of thermal drift.

The signal read by the head 6 is known as the head signal 15 (shown by FIG. 1). The spinstand 1 also generates two timing signals known as the measurement gate signal 11 and the servo gate signal 12. The measurement gate signal 11 is asserted when the head 6 is positioned over a data sector 10 and the servo gate signal 12 is asserted when the head 6 is positioned over a servo sector 9. These signals can be generated in a number of ways by the spinstand 1. For example, special timing marks may be written to the servo sectors 9 from which the servo gate signal 12 can be derived. Alternatively, since in many cases the spinstand 1 itself is used to write the servo sectors 9 to the disk 4, the position of the servo sectors 9 can be stored relative to the position of the spindle 2 at the time of writing the servo sectors 9, so that the servo gate signal 12 can be generated with reference to this stored information. The measurement gate signal 11 may be generated by a similar process. The measurement gate signal 11 and the servo gate signal 12 are used by the spinstand 1 to differentiate between the data and servo portions of the head signal 15 so that each can be processed as appropriate.

In general, when conducting a test with a spinstand 1, the head 6 is first positioned over a track 8 on the disk 4 and test data is written to the data sectors 10 of the track 8. The test data is subsequently read back by the head 6, measured, and analysed and the results then displayed to the user. Various parameters under which the data is written and/or read back can be controlled and varied by the spinstand 1, allowing the performance and characteristics of the head 6 or disk 4 to be investigated under various conditions.

Usually, a computer or similar processing apparatus is provided to carry out the various tests performed on the spinstand, and to analyse and display the measurements made with the spinstand. Additionally, dedicated parametric measurement electronics, a spectrum analyser or an oscilloscope may be provided for analysing and displaying the measurements made with the spinstand. In this way a series of tests may be conducted, including for example so-called bit error rate (BER) bathtubs, track squeeze, track centre, read/write offset, overwrite, etc. As described thus far, the spinstand 1 is of a known type.

A number of standard tests made by a spinstand 1 require using narrowband power measurements. A narrowband measurement is where the signal that is to be measured or detected has its power concentrated in a particular, relatively-narrow portion of the frequency spectrum. An example of such a test is the so-called "overwrite" test. This test involves writing a pattern of test data having a first frequency to a track 8 on the disk 4 with the head 6, and then subsequently overwriting this first pattern with a second pattern of test data having a different frequency. The track 8 is then read back with the head 6, and the head signal 15 obtained is analysed to measure the residual signal power of the overwritten pattern at the first frequency. This is accomplished by a narrowband measurement system focussed on the first frequency.

Because the residual signal power of the first frequency pattern is generally relatively low, it is necessary to use a measurement system with a high dynamic range in detecting and measuring the signal. In practice, this means that the measurement system needs to be capable of operating with a low resolution bandwidth (RBW) to improve the signal-to-noise capability of the measurement. Furthermore, it is expected that even lower RBWs will be needed in the future due to the trend in the art for the signal-to-noise ratio of modern heads 6 to become ever lower, and the expectation that next generation spinstand equipment will be required to operate with much higher frequencies of written data, for example up to 2 GHz.

A problem associated with using a measurement system operating at a low RBW is that this is normally achieved by using filters that have a high order and that have high "settling times". The settle time of a filter is a measure of how long it takes for the filter to achieve its steady state output in response to an input. In other words, the filter gives an accurate output only once it has had sufficient time to settle, i.e. once it has operated on a sufficient length of input signal.

Using a measurement system with a high settle time is problematic if the spinstand 1 has a large number of servo sectors 9. A large number of servo sectors 9 may be desired in order to increase the bandwidth of positional disturbances of the head 6 which can be tracked and characterised. In the present example, the spinstand has up to 1024 servo sectors 9. The spinstand 1 may rotate the disk 4 at speeds of between 1 thousand to 15 thousand revolutions per minute, which means a total revolution of the disk 4 takes between 4 ms to 60 ms. At such speeds, during read/write operations, the portions of the head signal 15 corresponding to data sectors 10 can be as short as 5 µs in length. Now, in order to perform the desired narrowband measurements, it may be desired that the measurement system is capable of operating at a RBW down to about 10 KHz using filters with a settle time of about 1 ms. Unfortunately in this case the settle time of the filter (i.e. 1 ms) far exceeds the period of the data sector 10 on which the measurement is being taken (i.e. 5 µs). As will be appreciated, the filter does not have time to settle on the data contained in a single data sector 10, and thus an accurate measurement is not possible using conventional techniques. Thus, currently in the art there is no adequate solution for using a very narrow RBW to measure test data from a spinstand 1 having a high number of servo sectors 9, and higher RBW filters must in practice be used instead.

Figure 3:
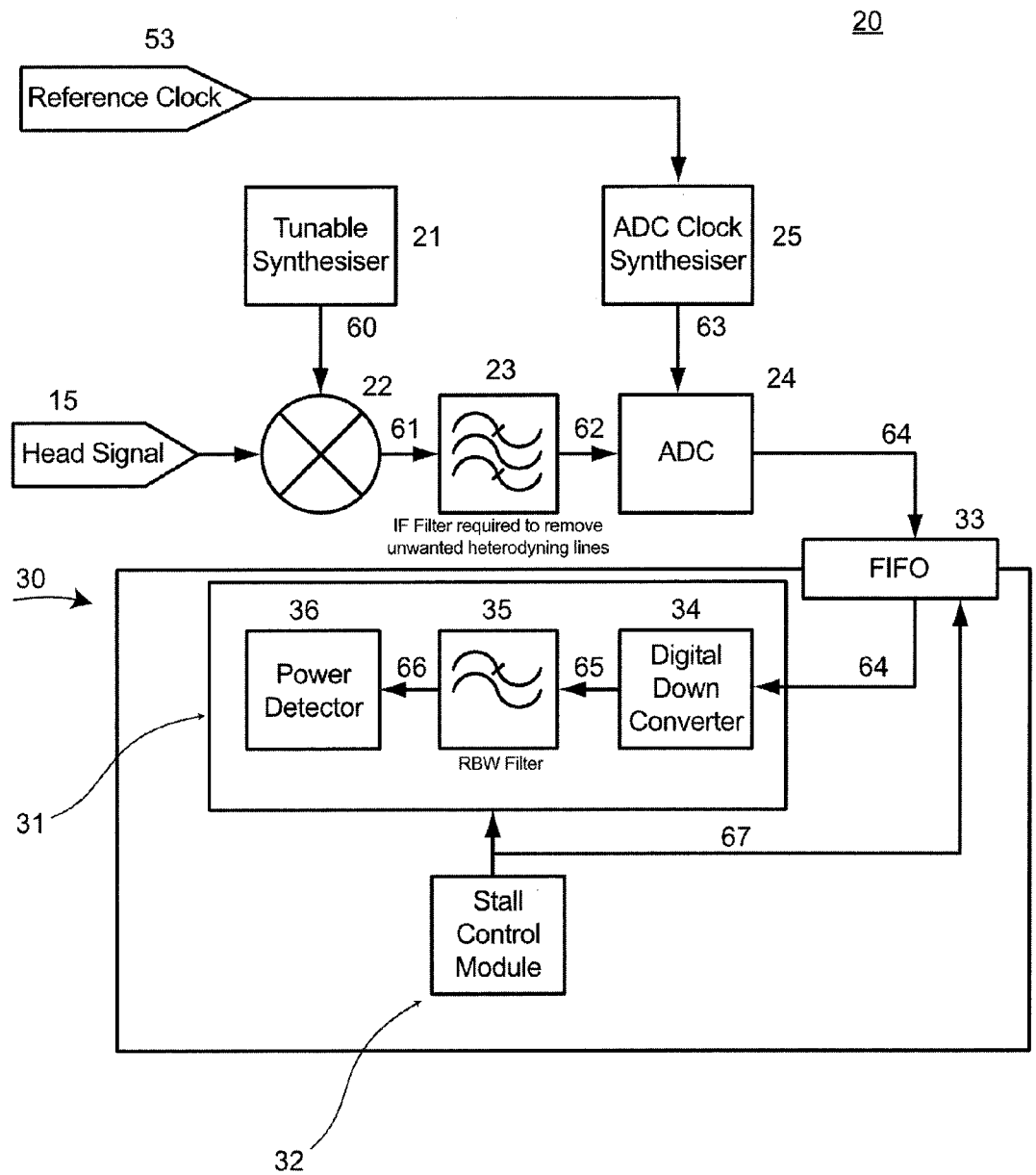
FIG. 3 shows an example of apparatus for performing spectral analysis on a test data signal according to an embodiment of the present invention.

FIG. 3 shows an example of a measurement system 20 in accordance with an embodiment of the present invention. This may be used for example in performing spectral analysis on the head signal 15 generated by the spinstand 1 to detect a frequency component of interest that is present in the data pattern written to the data sectors 10 of a track 8 on the disk 4. The frequency written to the disk 4 may for example be selected by the test operator to be in the range of 1 MHz to 2 GHz.

The measurement system 20 has an input stage comprising a RF down-converter 21,22,23 that works on the "super-heterodyning" principle. In this, the head signal 15 is mixed with a selected frequency sine wave 60 in order to frequency shift the frequency of interest to an intermediate frequency (IF). In the present example, a tunable synthesiser 21 is used to generate the desired frequency 60. The head signal 15 and the generated frequency 60 are fed to a mixer 22, where the signals are mixed in order to shift the frequency of interest to the IF. The shifted test data signal 61 is filtered by an IF filter 23 to remove unwanted heterodyning tones. In other examples, the RD down-converter 21,22,23 may comprise more than one conversion stage, for example an up conversion followed by two down conversations so as to remove unwanted products. In another example, the tunable synthesiser can be linked to a sweep generator so as to perform a spectrum analysis across a frequency range of interest.

The filtered signal 62 is then sampled and digitised by an analogue-to-digital converter (ADC) 24. A reference clock signal 53 is fed to a ADC clock synthesiser 25 which uses the reference clock signal 53 as a timing reference to generate a clock signal 63 for the ADC 24. As described in more detail in the following, it is preferred to use an ADC sampling rate that is an integer multiple of the IF. Most preferably, the sampling rate is four times the IF. In the present example, the IF is 12 MHz and the sampling rate is 48 MHz. Generally, the IF is selected first according to the design considerations of the RF down-converter, and the sampling rate of the ADC 24 is chosen afterwards according to the IF.

The sampled signal 64 is then passed to a digital signal processing (DSP) engine 30. The DSP engine 30 may for example be implemented in a field programmable gate array (FPGA). The DSP engine 30 comprises as its main blocks a measurement module 31 and a stall control module 32. A first-in-first-out buffer 33 (FIFO) is used as the input stage to the DSP system 30 and receives the sampled signal 64.

The measurement module 31 comprises a digital down-converter (DDC) 34 which receives the sampled signal 64 from the FIFO 33 and then down-converts the sampled signal 64 to a baseband signal 65. This baseband signal 65 is passed through a low pass filter 35, which acts as a RBW filter. In the present example, the bandwidth of the low pass filter is 10 kHz. Finally, the filtered signal 66 is passed to a power detector 36, which measures the power in the signal 66, so that this can be recorded or displayed to the user.

A DDC 34 is basically a complex mixer, shifting the frequency band of interest to baseband. The first stage of the DDC 34 is to mix, or multiply, this digitised stream of samples with a digitised cosine function for the phase (or real) channel and a digitised sine function for the quadrature (or imaginary) channel in order to generate sum and difference frequency components. The amplitude spectrum of both phase and quadrature channels will be the same but the phase relationship of the spectral components will be different. The filters in the real channel are identical to those in the imaginary channel in order to maintain the phase relationship between the signals. These aspects of a DDC 34 are well known in the art and are therefore not described in detail here.

The IF is preferably selected to be at a fixed integer ratio to the sampling rate of the ADC 24. This permits a simplification of the DDC 34 to be used. If the IF and the sample rate have a fixed relationship, the values of the sine and cosine functions with which the sampled signal 64 are multiplied rotate though a simple pattern. Therefore the DSP engine 30 does not need arbitrary sinusoidal generation capability or hardware multipliers. In the present example, the sampling rate of the ADC 24 is four times the IF. Thus, the sampled signal 64 is multiplied by a sine function and a cosine function having the values [1, 0, −1, 0] and [0, 1, 0, −1] respectively. The DDC 34 may therefore be simplified to comprise two 4-input multiplexers, one for the phase channel and one for the quadrature channel. For every successive sequence of four samples, it must replace the second and fourth sample with 0 and invert the third sample for the phase channel and it must replace the first and third sample with 0 and invert the fourth sample for the quadrature channel.

The stall control module 32 of the DSP engine 30 is arranged to generate a stall control signal 67 that stalls the measurement system 20 so that processing of samples 64 is suspended whilst the stall control signal 67 is asserted. The stall control signal 67 is generated in accordance with the following rules. The stall control signal 67 is asserted at the time when the servo gate signal 12 becomes asserted, i.e. when the end of a data sector 10 is reached. Whilst stalled, the stall control module 32 keeps track of the stall period. The stall control signal 67 is kept asserted for at least as long as the servo gate signal 12 is asserted so that the head signal 15 is not processed during the servo sector 9. When the servo gate signal 12 is released, i.e. when the beginning of the next data sector 10 is reached, the stall control signal 67 is not immediately released, but instead the stall period is extended as follows.

Before being released, the stall control signal 67 is optionally held in the asserted state for an additional programmable period beyond the release of the servo gate signal 12. This additional programmable period is helpful in allowing time for the RF down-converter 21,22,23 to settle. Note, the filter 23 of the RF down-converter is typically much wider bandwidth than the RBW filter 35 and with a lower order and therefore settles relatively quickly. The stall control module 32 continues to keep track of the overall period that stall has been asserted for during this additional period.

Whether or not the additional predetermined period is included in the stall period, the stall period is then extended to ensure that the total stall length is an integer multiple of the IF period.

Now, when writing the data pattern containing the frequency component of interest to the disk 4, the data pattern is written such that the phase of the frequency component is the same in each data sector 10, i.e. the phase remains unchanged through the servo sectors 9. This can be achieved as follows. A pattern generator (not shown) is used to generate the data pattern to be written to the disk 4. When the head is over the data portion 10, as determined by the measurement gate signal 11, the data pattern is written to the disk 4, and when the head is over a servo sector 9, as determined by the servo gate signal 12, the pattern generator output is inhibited so that no data is written to the servo sectors 9. Whilst the pattern generator output is inhibited, the pattern generator continues to run internally, such that when the data pattern is written in the next data sector 10 the phase of the data pattern remains the same.

Thus, by making the phase of the data pattern continuous and by controlling the stall period to be an integer multiple of the IF period, when the measurement module 31 is released from the stall, it begins to operate on samples again where the phase of the frequency component is substantially the same as when the stall was initiated. Thus, the measurement module 31 does not see any discontinuity in the phase of the frequency component either side of the servo sector 9, and thus the RBW filter 35 is not required to settle anew in each data sector 10. This means that a RBW filter 35 having a narrow bandwidth and a high settling time can be used with a spinstand 1 with short data sectors 10.

As previously described, it is preferred that the IF is selected to be at a fixed integer ratio to the sampling rate of the ADC 24. It is most preferred that the sampling ratio is a fixed integer multiple of the IF. This means that the stall period is equal to an integer number of samples, i.e. an integer multiple of the ratio of the IF to the sample period. Thus in the present example, where the sampling rate is four times the IF, the measurement module 31 is stalled for 4n samples. This makes the stall period simple to calculate. The DSP engine 30 is pre-programmed with the ratio of the IF to the sampling rate.

Alternatively this can be dynamically communicated to the DSP engine 30 in real time if desired, allowing the IF and/or sampling rate to be altered. The stall control module 32 then just needs to keep count of how many samples are not processed during the stall and to end the stall at the 4n th sample.

In contrast, if the sampling rate is not an integer multiple of the IF, then the end of the stall calculated to be in phase might occur between samples rather than coinciding with a sample. In this case, starting processing with the nearest sample would cause a discontinuity in phase in the signal, which would reduce the accuracy of the measurement. To avoid this, a less simple technique would be needed to characterise the IF phase and then restart measurement system 20 at the same IF phase in the next data sector 10 after the servo sector 9. In particular, in order to avoid a discontinuity, it would be necessary to extend the stall period for further multiples of the IF until the end of the stall period coincided with the occurrence of a sample to within an acceptable tolerance. For example, in the case where the ratio of the sampling rate to the IF is p:q (where p and q are integer values and q>1), the stall period will coincide with occurrence of a sample every (p×q)th sample, meaning that the stall period may have to be extended up to (p×q) samples to avoid a discontinuity.

This increases the complexity of calculating the stall period, as well as having the disadvantage of reducing the amount of available signal 15 that the filter 35 processes in each data sector 10.

In the present example, the stall control signal 67 is arranged in particular to stall the operation of the RBW low-pass filter 35. This can be done simply where digital logic such as in a FPGA is used to implement the DSP engine 30, by linking the enable line of the filter block to the stall control signal 67. The RBW low-pass filter 35 has the longest settling time, and so it is most important to stall at least this component. The DDC 34 has a much shorter latency, typically as low as a single clock cycle, and so it is not as important to stall the DDC 34 to allow it time to settle. Nonetheless, it is preferred to stall the DDC 34 together with the filter 35, so that the sine and cosine functions generated by the DDC 34 are in phase before and after the stall. Having the sine and cosine function in phase before and after the stall helps ensures that a discontinuity is not introduced, which might affect the accuracy of the measurement. The stall signal 67 may preferably be arranged to stall all components of the measurement module 31 when the stall control signal 67 is asserted.

To achieve the best results, it is important that the data pattern written to the data sectors 10 continues right up to the servo gate signal 12 being asserted, and that the DSP engine 30 responds immediately to servo gate signal 12 being asserted. There may be some practical difficulties doing this and therefore preferably the DSP engine 30 delays the processing of the incoming data in a buffer that is immediately flushed when the stall control signal 67 is asserted. This is implemented with the FIFO 33 positioned between the incoming ADC data and the DSP engine 30. Data is only taken from the FIFO 33 and passed to the measurement module 31 when the amount of data in the FIFO 33 exceeds a predetermined threshold (equivalent to the guard band required) and the DSP engine 30 is stalled if no valid data is ready from the FIFO 33. The stall control signal 67 is connected to the synchronous clear input of the FIFO. This type of FIFO is a standard block available in most FPGAs.

Thus, processing of the head signal 15 is suspended during each stall, i.e. during the interruption caused by the servo sectors 9. The stall is finished at a point where the frequency component of interest has the same phase as before the stall. This means that the RBW filter 35 does not need to resettle in each new data sector 10, as it sees substantially no discontinuity in phase in the signal. This allows a measurement system 20 having a low RBW to be used with a spinstand 1 having a high number of servo sectors 9, or otherwise short data sectors 10.

To demonstrate the advantages achievable by the present invention the following computer-based simulations of the measurement system were performed. In the simulations a 12 MHz IF is sampled by a 48 MSample/s ADC. The simulation is run with a single tone whose frequency sweeps from 50 kHz below the nominal IF to 50 kHz above the IF. The simulation is run for long enough at each frequency for the digital filters to settle and the result is sampled.

Figure 4:
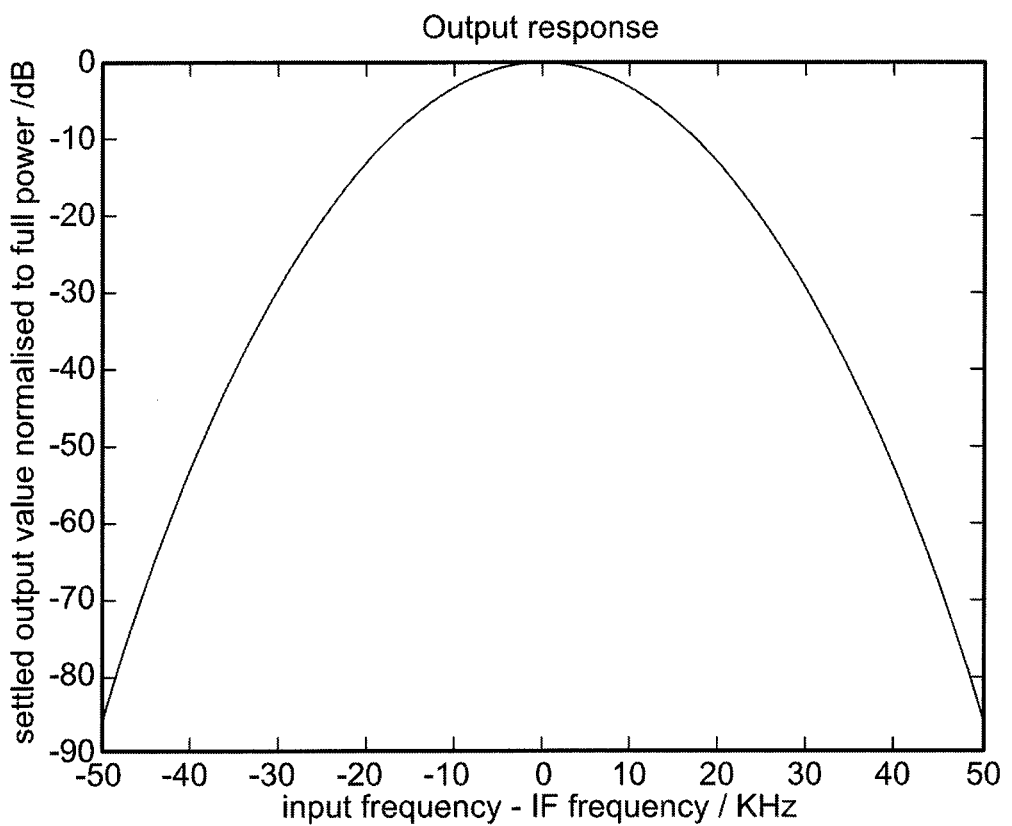
FIG. 4 shows the results of a simulation where there is no interruption to the data and no stall of the digital processing engine.

FIG. 4 shows the results where there is no interruption to the data and no stall of the DSP engine. The results show the characteristic Gaussian trace centred on the IF as expected where a pure tone is measured.

FIG. 5*a* shows the data pattern with a stall period of 1.0417 μs. In this case, the stall period is 12.5 times the IF, i.e. the stall period is not an integer multiple of the IF period.

1.0417 μs (stall period)=12.5×0.0833 μs (IF period)

As a result, as can be seen from FIG. 5b, there is a discontinuity in phase between the data before and after the stall of the DSP engine. As can be seen in FIG. 5c, the measurement is badly corrupted from the ideal response of FIG. 4 as the filters do not have time to settle to each fragment of signal.

FIG. 6a shows the data pattern with a stall period of 1 μs. In this case, the stall period is 12 times the IF, i.e. the stall period is an integer multiple of the IF period.

1 μs (stall period)=12×0.0833 μs (IF period)

FIG. 6b shows the sampled data. Since the stall period is an integer multiple of the IF period, the phase of the samples before the stall is the same as the phase after the stall. Thus the filters do not need to settle to each fragment of signal, since successive fragments have no discontinuity of phase. Thus the results as shown in FIG. 6c are approximately the same as the ideal response of FIG. 4.

It is preferred to down-convert the head signal 15 to an IF. However, this is not essential. The head signal 15 may be directly digitised and processed by the measurement system 20 if the digital logic used to implement the DSP engine 30 is fast enough to handle the faster sample rate. In this case, it will be appreciated that the frequency to be detected will replace the IF in the various calculations. For example, the stall period would be calculated to be an integer multiple of the period of the frequency to be detected.

Although the advantages of the measurement system 20 described herein have been described in relation to carrying out narrowband measurements during testing with a spinstand 1, the measurement system 20 is not limited to such an implementation. The measurement system 20 may be used to perform any suitable measurement where it is desired that the measurement system 20 has a low RBW and where the signal to be measured is available in short bursts or is subject to interruptions such that it is problematic for the measurement system 20 to settle during an individual portion of signal. The use of the measurement system 20 is expected to be useful when performing measurements on telecommunication signals, where the information is often carried in discrete packets. An example of this is packet streamed radio.

Embodiments of the present invention have been described with particular reference to the examples illustrated. However, it will be appreciated that variations and modifications may be made to the examples described within the scope of the present invention.

The invention claimed is:

1. A method of measuring a signal using a measurement system, the signal having a frequency component the power of which is to be detected by the measurement, the frequency component having a varying phase, the signal having at least one interruption thereto, the method comprising:
    processing the signal by the measurement system to detect the power of said frequency component in the signal;
    stalling the measurement system before the start of the interruption such that the signal is not processed during the interruption;
    calculating a stall period such that the end of the stall occurs:
    i) after the end of the interruption, and
    ii) where there is substantially no discontinuity between the phase of the frequency component in the signal at the end of the stall and in the phase of the frequency component in the signal at the beginning of the stall;
    keeping track of the elapsed stall time while the measurement system is stalled; and
    ending the stall of the measurement system when the elapsed stall time is at the end of the calculated stall period so as to resume processing of the signal.

2. A method according to claim 1, comprising calculating the stall period such that the end of the stall occurs
    iii) at least an additional predetermined time after the end of the interruption.

3. A method according to claim 1, comprising:
    prior to the step of processing the signal, down-converting the signal to an intermediate frequency such that the frequency component to be detected is centred on the intermediate frequency; and
    calculating the stall period to be an integer multiple of the period of the intermediate frequency.

4. A method according to claim 1, comprising:
    digitising the signal to produce a digitised signal comprising signal samples; and
    processing the samples by a digital processing engine to detect said frequency component in the signal;
    wherein the step of stalling the measurement system comprises at least stalling the digital processing engine.

5. A method according to claim 3, comprising:
    digitising the signal to produce a digitised signal comprising signal samples, wherein the ratio of the intermediate frequency to the sampling rate is substantially a integer ratio; and
    processing the samples by a digital processing engine to detect said frequency component in the signal;
    wherein the step of stalling the measurement system comprises at least stalling the digital processing engine.

6. A method according to claim 4, wherein the digital processing engine processes the samples by steps comprising:
    digitally down-converting the signal samples to a baseband signal;
    filtering the baseband signal with a low-pass filter that passes the frequency component; and
    detecting the power of the filtered signal;
    wherein the step of stalling the digital processing engine comprises stalling the low-pass filter.

7. A method according to claim 6, comprising:
    digitising the signal at a sampling rate that is four times the intermediate frequency;
    wherein digitally down-converting the digitised signal comprises:
    generating a phase channel from the digitised signal by multiplying each even-numbered sample by zero and multiplying each (4n+3)th sample by −1, where n is an integer >=0; and
    generating a quadrature channel from the digitised signal by multiplying each odd-numbered sample by zero and multiplying each (4n+4)th sample by −1, where n is an integer >=0;
    the method further comprising:
    filtering each of the phase channel and the quadrature channel with a respective low pass filter; and
    detecting the power of the filtered phase and quadrature channels.

8. A method according to claim 4, comprising:
    buffering the samples in a buffer prior to being processed by the digital processing engine; and
    flushing the samples in the buffer when the interruption is detected.

9. A method of testing one or more components of a disk drive with a spinstand having a disk and a read/write head, the method comprising:

reading a track formed on the disk with the read/write head to provide a head signal, wherein the track has a data portion containing a data pattern and at least one servo sector containing servo information interspersed with the data portion, wherein the data pattern contains a frequency component having a varying phase, and each of said at least one servo sectors constitutes a respective interruption to the head signal; and measuring the head signal by a measuring system, wherein said measuring the head signal comprises:

processing the signal by the measurement system to detect the power of said frequency component in the signal;

stalling the measurement system before the start of the interruption such that the signal is not processed during the interruption;

calculating a stall period such that the end of the stall occurs:

i) after the end of the interruption, and ii) where there is substantially no discontinuity between the phase of the frequency component in the signal at the end of the stall and in the phase of the frequency component in the signal at the beginning of the stall;

keeping track of the elapsed stall time while the measurement s stem is stalled; and ending the stall of the measurement system when the elapsed stall time is at the end of the calculated stall period so as to resume processing of the signal.

10. A method according to claim 9, comprising writing said data portion to the disk such that the frequency component is in phase with itself on both sides of the servo sector.

11. A method according to claim 9, comprising:

generating a servo gate signal with the spinstand; and using said servo gate signal as a timing reference in the measurement system to determine the start of the interruption and the end of the interruption.

12. Apparatus for measuring a signal, the signal having a frequency component the power of which is to be detected by the measurement, the frequency component having a varying phase, the signal having at least one interruption thereto, the apparatus comprising:

a measurement module arranged to process the signal so as to detect the power of said frequency component in the signal; and a stall control module arranged to stall the measurement module before the start of the interruption such that the signal is not processed during the interruption;

wherein the stall control module is arranged to calculate a stall period such that the end of the stall occurs:

i) after the end of the interruption, and ii) where there is substantially no discontinuity between the phase of the frequency component in the signal at the end of the stall and in the phase of the frequency component in the signal at the beginning of the stall;

wherein the stall control module is arranged to keep track of the elapsed stall time while the measurement system is stalled; and wherein the stall control module is arranged to end the stall of the measurement module when the elapsed stall time is at the end of the calculated stall period so as to resume processing of the signal.

13. Apparatus according to claim 12, wherein the stall control module is arranged to calculate the stall period such that the end of the stall occurs iii) at least an additional predetermined time after the end of the interruption.

14. Apparatus according to claim 12, wherein the measurement module comprises:

a frequency down-converter arranged to down-convert the signal to an intermediate frequency prior to being processed by the measurement module such that the frequency component to be detected is centred on the intermediate frequency;

wherein the stall control module is arranged to calculate the stall period to be an integer multiple of the period of the intermediate frequency.

15. Apparatus according to claim 12, wherein the measurement module comprises:

an analogue-to-digital converter arranged to digitise the signal to produce a digitised signal comprising signal samples; and a digital processing engine arranged to process the samples to detect said frequency component in the signal;

wherein the stall control module is arranged to stall the measurement module by stalling the digital processing engine.

16. Apparatus according to claim 14, wherein the measurement module comprises:

an analogue-to-digital converter arranged to digitise the signal to produce a digitised signal comprising signal samples at a sampling rate, wherein the ratio of the intermediate frequency to the sampling rate is substantially a integer ratio; and a digital processing engine arranged to process the samples to detect said frequency component in the signal;

wherein the stall control module is arranged to stall the measurement module by stalling the digital processing engine.

17. Apparatus according to claim 15, wherein the digital processing engine comprises:

a digital down-converter arranged to digitally down-converter the digitised signal to a baseband signal;

a low-pass filter arrange to filter the baseband signal so as to pass the frequency component; and a power detector arranged to detect the power of the filtered signal;

wherein the stall control module is arranged to stall the digital processing engine by stalling the low-pass filter.

18. Apparatus according to claim 17, wherein the analogue-to-digital converter and the frequency down-converter are arranged such that the signal is digitised at a sampling rate that is four times the intermediate frequency;

wherein the digital down-converter is arranged to digitally down-convert the digitised signal by:

generating a phase channel from the digitised signal by multiplying each even-numbered sample by zero and multiplying each (4n+3)th sample by −1, wherein n is an integer >=0; and generating a quadrature channel from the digitised signal by multiplying each odd-numbered sample by zero and multiplying each (4n+4)th sample by −1, wherein n is an integer >=0;

wherein each of the phase channel and the quadrature channel is filtered with a respective low pass filter; and the power of the filtered phase and quadrature channels is detected.

19. Apparatus according to claim 15, comprising:

a buffer arranged to buffer the samples prior to being processed by the digital processing engine;

wherein the stall control module is arranged to flush the samples in the buffer when the interruption is detected.

20. A system comprising: a spinstand and apparatus for measuring a signal according to claim 12, wherein the spinstand comprises:
- a read/write head;
- a disk; and
- a track formed on the disk having a data portion containing a data pattern and at least one servo sector containing servo information interspersed with the data portion;
- wherein the spinstand is arranged to read the track with the head to provide a head signal, and the apparatus is arranged to measure the head signal;
- wherein the data pattern contains said frequency component to be detected by the measurement module and each of said at least one servo sectors constitutes a respective interruption to the signal.

21. System according to claim 20, wherein the data portion is written to the disk such that the frequency component is in phase with itself on both sides of the servo sector.

22. System according to claim 20, wherein the spinstand is arranged to generate a servo gate signal and the measurement module is arranged to use the servo gate signal as a timing reference in to determine the start of interruption and end of the interruption.

\* \* \* \* \*